J. Ayers.
Harrow.
№ 56,159.  Patented July 10, 1866.
  
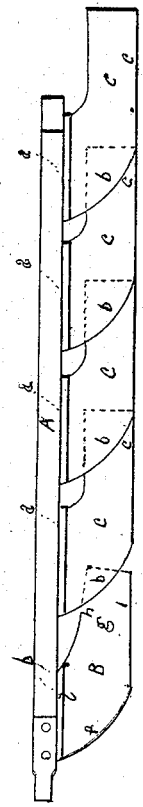 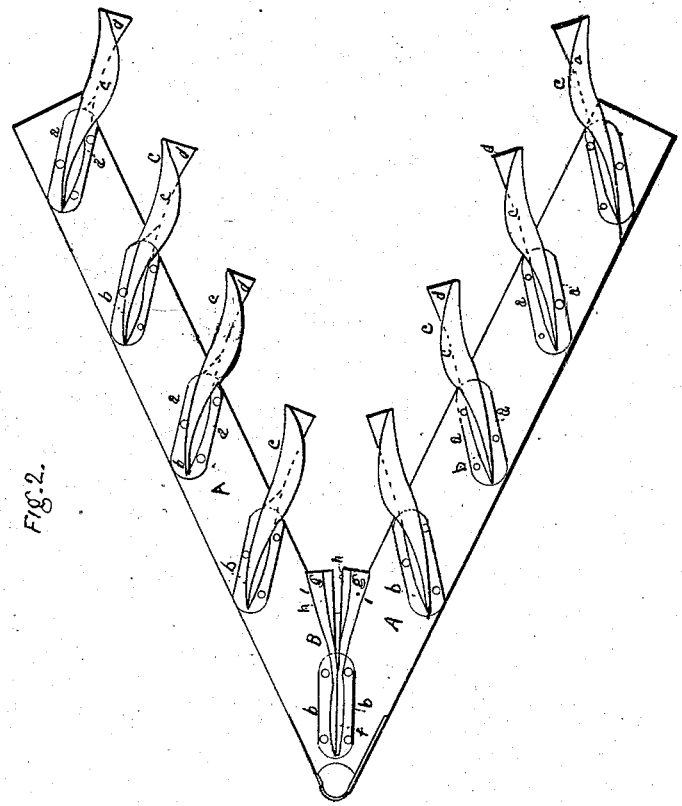
Witnesses:
Inventor:

UNITED STATES PATENT OFFICE.

JONATHAN AYERS, OF CANTERBURY, NEW HAMPSHIRE.

IMPROVEMENT IN HARROWS.

Specification forming part of Letters Patent No. 56,159, dated July 10, 1866.

*To all whom it may concern:*

Be it known that I, JONATHAN AYERS, of Canterbury, in the county of Merrimac and State of New Hampshire, have invented a new and useful Improvement in Harrows; and I do hereby declare the same to be fully described in the following specification and represented in the accompanying drawings, of which—

Figure 1 is a side elevation, and Fig. 2 an under-side view, of a harrow provided with my invention. Fig. 3 is a front view, Fig. 4 a rear elevation, and Fig. 5 a transverse section, of one of its teeth.

Each flank-tooth is made with a knife-edge to enter the ground, a curved lip to pass underneath and turn up the ground, and another bend or curve to throw it over, as does the mold-board of a plow.

In the drawings, A is the harrow-frame, made in the ordinary manner. B is the first or front tooth, provided with two wings, $g\ g$, and two fastening-lips, $l\ l$. C C C are the flank or single-winged teeth, each of the latter being formed as a plate provided with two lips, $a\ a$, for securing it to the frame by screws going through such lips. Each of such teeth has its front an inclined knife-edge, $b$, from which a wing projects and is curved two ways—viz., as shown at $c$ and $d$. When the harrow is in use the knife-edge cuts vertically into the soil with a drawing stroke. The lip or part $c$ goes laterally underneath the soil and turns it up, and the part $d$ subsequently throws it over or turns it, as does the mold-board of a plow.

The several flank-teeth are arranged at equal or about equal distances apart on each wing of the harrow-frame. The first or front tooth has but one inclined knife-edge, $f$, each of its wings being formed with two curves, $h\ i$, so as to operate in the same manner in which a wing of each of the other teeth acts.

I claim—

1. The front tooth, B, as made with the inclined knife-edge $f$ and the two double-curved wings $g\ g$, as set forth.

2. Each lateral tooth as made with the knife-edge $b$ and the curved furrow-opening lip $c$ and the curved furrow-turning lip or part $d$, arranged as specified.

JONATHAN AYERS.

Witnesses:
R. H. EDDY,
SAMUEL N. PIPER.